A. E. HOLMES.
CHAIN TONGS.
APPLICATION FILED JAN. 3, 1916.
1,196,359.
Patented Aug. 29, 1916.
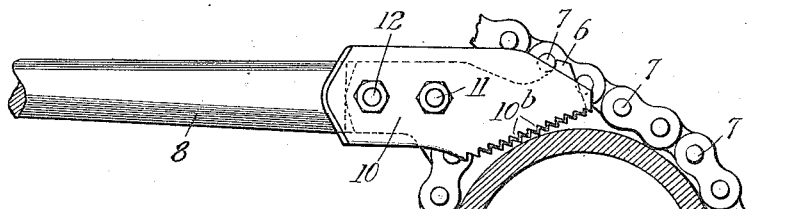
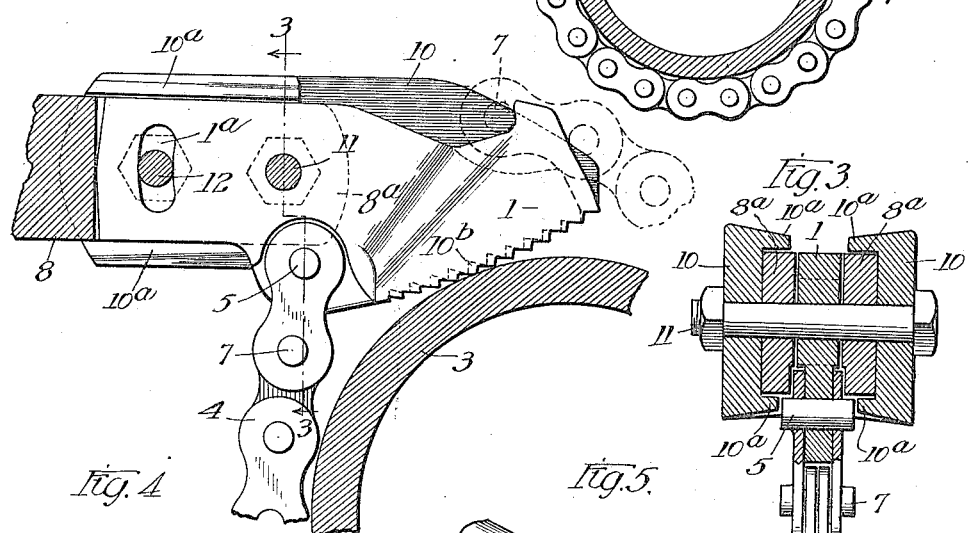
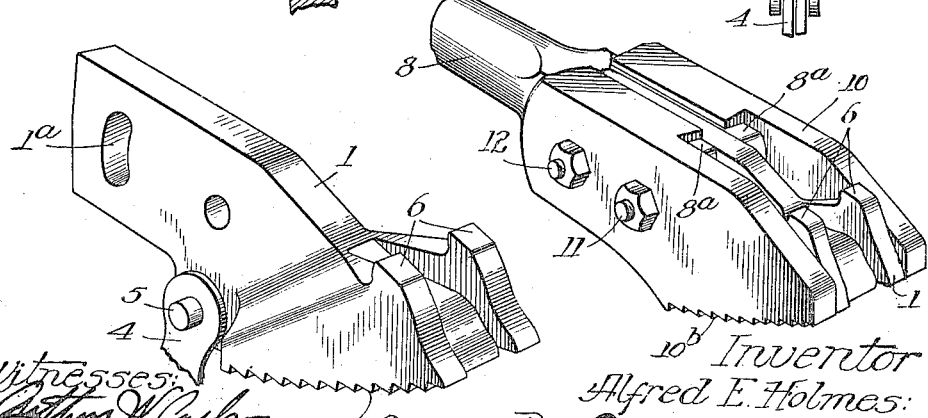
Inventor
Alfred E. Holmes:
By Cheever & Cox attys

UNITED STATES PATENT OFFICE.

ALFRED E. HOLMES, OF CHICAGO, ILLINOIS, ASSIGNOR OF ONE-HALF TO WILLIAM J. MOHR, OF CHICAGO, ILLINOIS.

CHAIN TONGS.

1,196,359.  Specification of Letters Patent.  Patented Aug. 29, 1916.

Application filed January 3, 1916. Serial No. 69,784.

*To all whom it may concern:*

Be it known that I, ALFRED E. HOLMES, a citizen of the United States, residing at Chicago, in the county of Cook and State of Illinois, have invented a certain new and useful Improvement in Chain Tongs, of which the following is a specification.

My invention relates to chain tongs, and the object of the invention is to provide a device having a more efficient and secure gripping upon a pipe or other object, than is afforded by the devices now known.

I accomplish my object by the construction illustrated in the accompanying drawings, in which—

Figure 1 is a side elevation of a device embodying my invention, the same being shown in acting position upon a section of pipe. Fig. 2 is similar to Fig. 1, showing the parts on an increased scale and showing one of the side jaws of the tongs removed to better reveal the construction of the parts. Fig. 3 is a transverse sectional view on the line 3—3, Fig. 2. Fig. 4 is a perspective view of the engaging dog, and Fig. 5 is a perspective view of the side face, engaging dog and portion of the handle.

Similar numerals refer to similar parts throughout the several views.

In the form selected to illustrate the invention, the dog 1 is provided with teeth 2 for engaging the surface of the pipe or other cylindrical piece of work 3. By preference these teeth are arranged approximately in form of an arc which presents its convex side to the convex cylindrical surface of the work. The chain 4 is permanently attached to the dog by a pin 5 carried by the dog, preferably on the front side thereof, as shown in Fig. 2 and elsewhere. Shoulders 6, 6 are provided on the dog, preferably on the back thereof, for engaging the different link pins 7. Said link pins extend beyond each side of the chain and perform the dual function of articulately connecting the links of the chain together and serving as means for detachably attaching the free portion of the chain to the dog. By preference, the shoulders 6 are spaced apart as best shown in Figs. 4 and 5, and receive the chain between them thus serving as keepers for preventing the chain from becoming laterally displaced.

A handle 8 bifurcates at its outer end into two branches 8ª, 8ª, which receive the dog 1 between them and hold said dog laterally in place. Two jaw plates 10, 10, are located at the outer sides of the branches 8ª, as best shown in Fig. 3. These jaw plates are held in place by two pins 11 and 12 and are provided with flanges 10ª, 10ª which engage the upper and lower edges of the handle branches 8ª and assist the pins 11 and 12 in securing the parts together. Said plates may be dispensed with without entirely departing from the spirit of my invention, although they are of advantage in adding to the strength of the tool and in adding a function hereinafter described. In the form shown, said jaw plates are provided with teeth 10ᵇ arranged in the form of an arc to correspond with the arc of the teeth 2 of the dog. The teeth 10ᵇ, however, are supplemental, normally lying slightly back of the teeth 2 so as to engage the work only under exceptional conditions.

The outer bolt or pin 11 serves as a fulcrum or pivot for the dog. A slot 1ª, best shown in Figs. 2 and 4, is formed at the inner end of the dog and it is through this slot that the stop pin 12 passes. It permits the dog to swing through a limited arc relatively to the handle and jaw plates.

In operation, the user first lays the toothed edge of the dog upon the work and then passes the chain up around the work in the usual manner, finally laying the nearest available link pin 7 in the seat formed behind the shoulders 6, 6. The user then cants the handle until the stop pin strikes one end or the other of the slot 1ª thus preventing further relative movement between the handle and the dog. The dog may then be said to be seated upon the handle. At this time the teeth on the jaw plates are close to, but out of actual contact with the work, as best shown in Figs. 1 and 2. The jaw teeth hence act in reserve and normally come into action only after the teeth of the dog have gripped the work. By this construction the gripping action of the tool on the work is certain, even after the teeth on the dog become worn. Another advantage in this construction is that in case the pipe is covered with scale or is pitted by rust or is uneven from any other cause, the teeth on the jaw plates will be in a position to take hold of the work and supplement the action of the teeth on the dog. In other words, it may be said that the preferred construction is such that when the tool is set and the stop pin 12 is at the working end of the slot 1ª, the jaw-plate teeth will be just behind the dog-teeth in position to supplement the action of the latter in case of need.

Another advantage of my construction is that by having a limited amount of play between the handle and the parts which normally grip the chain, the gripping parts are better able to adjust themselves to the work and obtain a greater degree of efficiency in action. Furthermore, the dog instantly releases the work as soon as the operator releases his pressure upon the handle. Consequently, there is no engagement of the tool with the work after it should be terminated. Again, the direction of strain of the tool on the work is such as to avoid the danger of crushing the work.

Having thus described my invention, what I claim as new, and desire to secure by Letters Patent, is:—

1. Chain tongs having a handle, an engaging dog pivoted thereto, means for limiting the amount of rotary movement of the dog relatively to the handle, and a chain anchored to the dog at one end and detachably attachable to the dog at the other end, the dog having teeth for engaging the work, and the distance between the anchoring point of the chain to the dog and the point where the dog normally engages the work being less than the distance between the point of detachable attachment of the chain to the dog and the point where the dog normally engages the work.

2. Chain tongs having a handle, an engaging dog having teeth for engaging the work, a pivot pin articulately connecting the dog to the handle, means for limiting the amount of movement of the dog relatively to the handle, a chain anchored at one end to the dog and at the other end detachably attachable thereto, the distance between the point where the chain is anchored to the dog and the point where the dog normally engages the work being less than the distance between said pin and the point where the dog normally engages the work.

3. Chain tongs having a handle, an engaging dog pivoted thereto between its ends, a slot and pin for limiting the rotary movement of the dog relatively to the handle, a chain anchored to the front of said dog and adapted to be disconnectibly connected to the back of the dog.

4. Chain tongs having a handle, an engaging dog pivotally attached thereto, means for limiting the movement of the dog relatively to the handle, a chain coöperating with said dog, and a supplemental row of teeth fixed relatively to the handle for supplementing the gripping action of the dog upon the work.

5. Chain tongs having a handle, an engaging dog pivotedly attached thereto, means for limiting the movement of the dog relatively to the handle, a chain coöperating with said dog, and jaw plates fastened to the sides of the handle and each having a row of teeth adjacent to and slightly behind the teeth on the dog when the latter is in acting position.

6. Chain tongs having a handle bifurcated at its outer end, a dog articulately mounted between the branches of the bifurcated handle, means for limiting the relative movement of the dog and handle, a chain coöperating with the dog, and jaw plates fastened to the sides of the handle and provided with teeth for supplementing the gripping action of the dog, said plates having flanges engaging the handle back and front for increasing the security of position of the plates relatively to the handle.

In witness whereof, I have hereunto subscribed my name in the presence of two witnesses.

ALFRED E. HOLMES.

Witnesses:
KATHRYN S. READY,
M. S. ROSENWEIG.

Copies of this patent may be obtained for five cents each, by addressing the "Commissioner of Patents, Washington, D. C."